United States Patent
Efros et al.

(10) Patent No.: US 12,073,844 B2
(45) Date of Patent: Aug. 27, 2024

(54) AUDIO-VISUAL HEARING AID

(71) Applicant: Google LLC, Mountain View, CA (US)

(72) Inventors: Anatoly Efros, Rishon LeZion (IL); Noam Etzion-Rosenberg, Binyamina (IL); Tal Remez, Jerusalem (IL); Oran Lang, Givatayim (IL); Inbar Mosseri, Raanana (IL); Israel Or Weinstein, Tel Aviv (IL); Benjamin Schlesinger, Ramat Hasharon (IL); Michael Rubinstein, Natick, MA (US); Ariel Ephrat, Efrat (IL); Yukun Zhu, Shoreline, WA (US); Stella Laurenzo, Seattle, WA (US); Amit Pitaru, Brooklyn, NY (US); Yossi Matias, Tel Aviv (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/601,042

(22) PCT Filed: Oct. 1, 2020

(86) PCT No.: PCT/US2020/053843
§ 371 (c)(1),
(2) Date: Oct. 1, 2021

(87) PCT Pub. No.: WO2022/071959
PCT Pub. Date: Apr. 7, 2022

(65) Prior Publication Data
US 2023/0267942 A1  Aug. 24, 2023

(51) Int. Cl.
*G10L 21/0208* (2013.01)
*G10L 17/00* (2013.01)
(Continued)

(52) U.S. Cl.
CPC .......... *G10L 21/0208* (2013.01); *G10L 17/00* (2013.01); *G10L 21/0272* (2013.01); *G10L 25/57* (2013.01); *G10L 2021/02087* (2013.01)

(58) Field of Classification Search
CPC ..... G10L 25/57; G10L 21/0208; G10L 17/00; G10L 21/0272; G10L 2021/02087
See application file for complete search history.

(56) References Cited

U.S. PATENT DOCUMENTS

| | | | |
|---|---|---|---|
| 6,421,645 B1 * | 7/2002 | Beigi | G10L 17/00 704/E15.045 |
| 11,610,599 B2 * | 3/2023 | Grauman | G06N 3/063 |

(Continued)

FOREIGN PATENT DOCUMENTS

| WO | WO 2019/104229 | 5/2019 |
|---|---|---|
| WO | WO 2020/128087 | 6/2020 |

OTHER PUBLICATIONS

Ephrat, Ariel, et al. "Looking to listen at the cocktail party: A speaker-independent audio-visual model for speech separation." arXiv preprint arXiv:1804.03619 . (Year: 2018).*

(Continued)

*Primary Examiner* — Samuel G Neway
(74) *Attorney, Agent, or Firm* — Fish & Richardson P.C.

(57) ABSTRACT

Methods, systems, and apparatus, including computer programs encoded on computer storage media, for audio-visual speech separation. A method includes: receiving, by a user device, a first indication of one or more first speakers visible in a current view recorded by a camera of the user device, in response, generating a respective isolated speech signal for each of the one or more first speakers that isolates speech of the first speaker in the current view and sending the isolated speech signals for each of the one or more first speakers to a listening device operatively coupled to the user device, receiving, by the user device, a second indication of (Continued)

one or more second speakers visible in the current view recorded by the camera of the user device, and in response generating and sending a respective isolated speech signal for each of the one or more second speakers to the listening device.

20 Claims, 3 Drawing Sheets

(51) Int. Cl.
  *G10L 21/0272* (2013.01)
  *G10L 25/57* (2013.01)

(56) References Cited

U.S. PATENT DOCUMENTS

| | | | | |
|---|---|---|---|---|
| 2015/0088515 | A1* | 3/2015 | Beaumont | G10L 17/06 |
| | | | | 704/251 |
| 2016/0163331 | A1* | 6/2016 | Yamaguchi | G11B 27/105 |
| | | | | 704/235 |
| 2018/0174600 | A1* | 6/2018 | Chaudhuri | H04N 21/44008 |
| 2019/0005976 | A1* | 1/2019 | Peleg | G10L 25/30 |
| 2019/0139563 | A1* | 5/2019 | Chen | G06N 3/044 |
| 2019/0341054 | A1* | 11/2019 | Krupka | H04N 7/15 |
| 2020/0335121 | A1* | 10/2020 | Mosseri | G10L 25/57 |
| 2021/0289300 | A1* | 9/2021 | Tiefenau | H04R 25/43 |
| 2021/0312915 | A1* | 10/2021 | Shaked | G10L 21/0272 |
| 2021/0390970 | A1* | 12/2021 | Zhang | G06V 40/171 |
| 2023/0267942 | A1* | 8/2023 | Efros | H04R 25/554 |
| | | | | 704/226 |

OTHER PUBLICATIONS

PCT International Search Report and Written Opinion in International Application No. PCT/US2020/053843, dated Apr. 6, 2021, 15 pages.

International Preliminary Report on Patentability in International Appln. No. PCT/US2020/053843, mailed on Apr. 13, 2023, 10 pages.

* cited by examiner

AUDIO-VISUAL HEARING AID

CROSS-REFERENCE TO RELATED APPLICATION

This application is a national phase entry under 35 U.S.C. 371 of PCT Application Serial No. PCT/US2020/053843, filed Oct. 1, 2020, which is hereby incorporated by reference in its entirety.

BACKGROUND

This specification relates to a system and methods for implementing audio-visual speech separation on a user device.

Neural networks are machine learning models that employ one or more layers of nonlinear units to predict an output for a received input. Some neural networks include one or more hidden layers in addition to an output layer. The output of each hidden layer is used as input to the next layer in the network (i.e., the next hidden layer or the output layer). Each layer of the network generates an output from a received input in accordance with current values of a respective set of parameters.

SUMMARY

This specification describes a system implemented as computer programs on one or more computers in one or more locations that receives an input video in real-time of one or more speakers and produces an isolated speech signal for each of one or more speakers in the video. An isolated speech signal for a speaker is one in which only the speech of the speaker can be heard.

In this specification, a "speaker" refers to a source of speech, e.g., a person, and the speech itself can be spoken directly by a person, or generated or recorded and emitted by audio equipment.

A user device configured according to techniques described in this specification provides an interface for selecting different speakers, and generating corresponding isolated speech signals for playback in real time and corresponding to the different selected speakers.

Automatic speech separation is the problem of separating an audio soundtrack of speech of one or more speakers into isolated speech signals of each respective speaker, to enhance the speech of a particular speaker and/or to mask the speech of other speakers so that only particular speakers are heard. The audio soundtrack may be accompanied by a corresponding video of one or more of the respective speakers. The audio soundtrack may be of one speaker (sometimes called a "clean" audio soundtrack) or of multiple speakers (sometimes called a "noisy" audio soundtrack). A soundtrack can also include additional background noise. Background noise is any sound not from the speech of the one or more speakers (e.g., audience applause, music, or ambient environmental sounds).

According to an aspect, a method including receiving, by a user device, a first indication of one or more first speakers visible in a current view recorded by a camera of the user device; in response to receiving the first indication, generating a respective isolated speech signal for each of the one or more first speakers that isolates speech of the first speaker in the current view and sending the isolated speech signals for each of the one or more first speakers to a listening device operatively coupled to the user device; while generating the respective isolated speech signal for each of the one or more first speakers, receiving, by the user device, a second indication of one or more second speakers visible in the current view recorded by the camera of the user device; and in response to the second indication, generating and sending a respective isolated speech signal for each of the one or more second speakers to the listening device.

The subject matter described in this specification can be implemented in particular implementations so as to realize one or more of the following advantages. Speech separation can be improved in settings with significant background noise and overlapping audio. The system receives video with accompanying audio in real-time and recorded by a user device aimed by a user towards certain speakers of interest, and provides isolated speech signals for detected speakers in the video with minimal delay. Certain speakers can be preferred over others, e.g., according to predetermined preferences or based on the presence or absence of the certain speakers in the current view of the camera recording the input video at a given time.

The user device as described in this specification allows a user, particularly a user with a hearing impairment, to effectively participate in conversations in a crowded setting. The speech of certain speakers can be enhanced by directing the user device, such as a field of view of one or more cameras of the user device, towards the speaker, which can be helpful particularly in settings in which a user of the device is speaking to an individual in a crowd, e.g., as part of a panel discussion. The user device can be quickly re-directed to adjust to different speakers, even when the speakers are in different physical locations and are not using voice amplification equipment.

The system is speaker-independent, i.e., is able to work for any speaker and not just for a specific speaker or set of speakers like some conventional systems, and, after a period of calibration, can continue to isolate speech even when a speaker is not in current view of a camera of a user device. The system can be applied to a variety of different settings in which clean audio of a particular speaker is desired but no assumption is made about the visibility of each speaker's face.

The system can also process videos for automatic speech recognition and video transcription (i.e., creating a transcript for speech in a video that identifies the respective speakers).

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
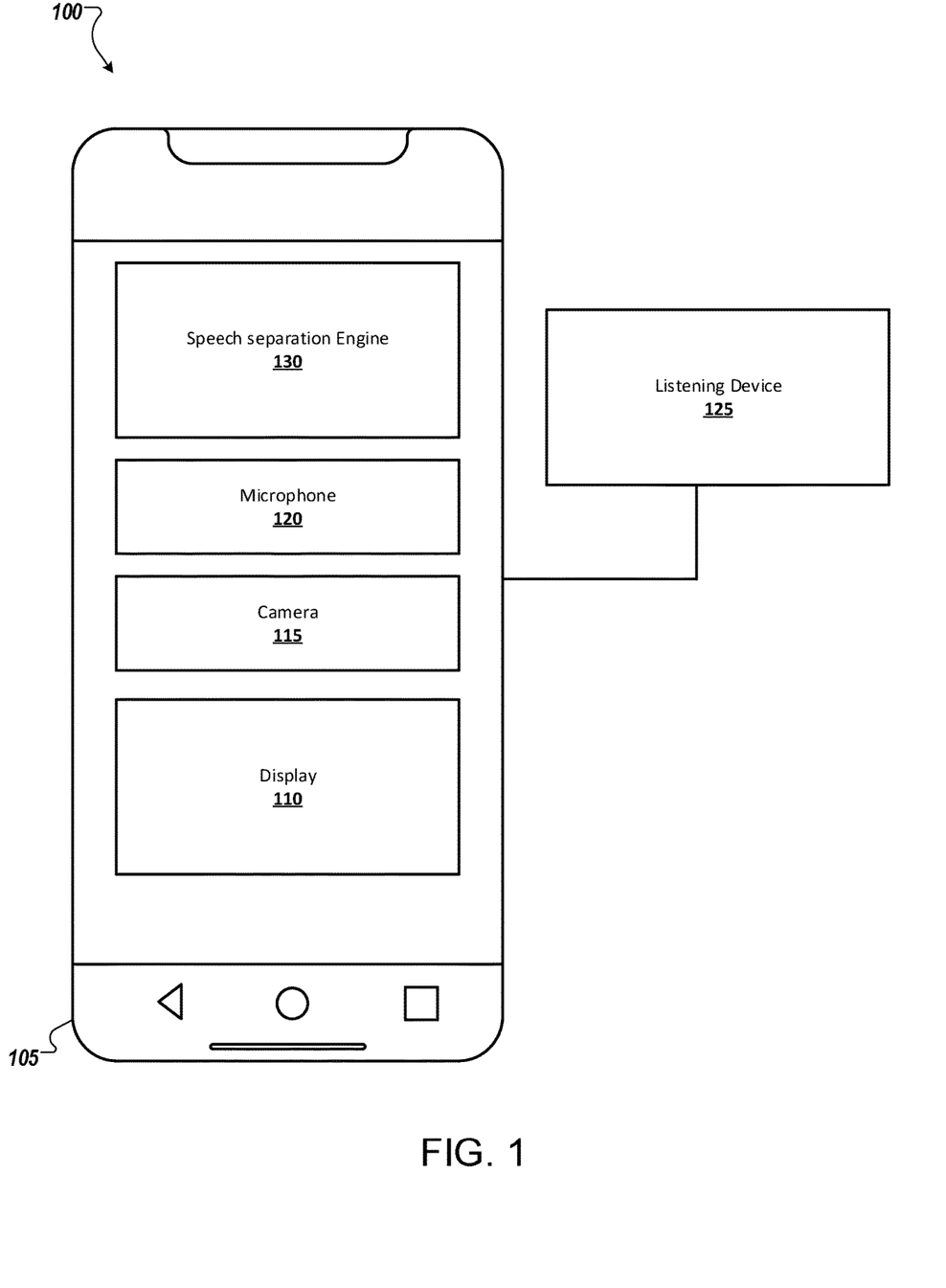
FIG. 1 is a diagram of an audio-visual speech separation system.

FIG. 1 shows an example of a system 100 usable to perform audio-speech separation in real-time. The system includes a user device 105. The user device 105 can be any computing device that is operatively coupled to a display 110, a camera 115, a microphone 120, and a listening device 125.

The user device 105 is also configured to access a speech separation engine 130, which can be implemented on the user device 105 directly, or implemented on another device, e.g., a server, that is operatively coupled to the user device 105.

The speech separation engine 130 is configured to process an input video of one or more speakers to generate isolated speech signals for each speaker. The speech separation engine 130 is configured to receive the input video as the input video is recorded using the camera 115 operatively coupled to the user device 105. The camera 115 can be implemented directly on the user device 105, e.g., as a back-facing or front-facing camera of the user device. The camera 115 can alternatively be physically remote from the user device 105, but operatively coupled to the user device 105, e.g., with physical connections like A/V cables, or wirelessly over a network.

In addition to video, the user device 105 records an audio soundtrack, i.e., using the microphone 120, corresponding to the video, which is also received as input by the speech separation engine 130. Similar to the camera 115, the microphone may or may not be implemented directly on the user device 105. The audio soundtrack may be recorded contemporaneously with the input video.

The speech separation engine 130 implements one or more neural networks configured to process an input video of one or more speakers and generate isolated speech signals for each speaker, from joint audio-visual features of each speaker. The joint audio-visual features of each speaker are derived from the input video and audio soundtrack discussed above. In particular, the speech separation engine 130 generates the joint audio-visual features for each speaker from the respective separately processed audio and visual features, before processing the joint audio-visual features. In some implementations, the engine 130 processes the features through a masking neural network. The masking neural network generates a spectrogram mask for each speaker, which the engine 130 applies to a spectrogram of the audio soundtrack, generating a respective separated spectrogram for each speaker. A spectrogram is a representation of the frequencies of an audio signal. Specifically, a spectrogram represents, at a given time, the corresponding frequency of the audio soundtrack. The system outputs an isolated speech signal from the separated spectrogram. More details for implementing one or more neural networks to generate isolated speech signals for each speaker from joint audio-visual features of each speaker can be found in PCT International Publication Number WO 2019/104229 A1 for "AUDIO-VISUAL SPEECH SEPARATION."

The speech separation engine 130 is configured to receive a (i) stream of frames containing faces of one or more of the speakers and (ii) an accompanying audio soundtrack of the speakers speaking in the video, as well as possible background noise. The speech separation engine 130 is configured to identify faces of speakers in the input video, and to generate features, i.e., embeddings, of features for each identified face. Each frame is annotated with face embeddings for faces identified in a current frame for the input video. For example, the speech separation engine 130 can deploy a lightweight face embedding model to process input video frame by frame to generate face embeddings.

An embedding is an ordered collection of numeric values (e.g., a vector of floating point or quantized floating point values). A face embedding is a vector of features for a face, and generally maps different variables, e.g., related to facial structure, complexion, and mouth characteristics of a speaker, to different numeric values which can be processed by an appropriately configured machine learning model. Face embeddings represent visual features of a face while removing irrelevant features that vary between each frame, such as illumination of the speaker's face. Alternatively, visual features of a speaker can be represented by the raw pixels of the frames containing the respective speaker. The engine 130 can identify and generate embeddings for faces according to any conventional technique, i.e., one or more neural networks trained to perform facial recognition.

In some implementations, the engine 130 can generate an isolated speech signal by first generating a spectrogram mask. A spectrogram mask describes the time-frequency relationships between clean speech for a speaker and background interference, i.e., noise and the speech of other speakers in a spectrogram of an audio soundtrack. Specifically, a spectrogram mask for a speaker is a set of values that can be applied, e.g., by multiplication, on a spectrogram at each of a plurality of intervals of time, to modify the spectrogram at that time-frequency bin to represent only the frequency of the speech of the speaker (e.g., by masking out parts of the frequency at that interval of time associated with other speakers, or background noise). A background noise mask is a set of values that similarly can be applied on a spectrogram, but for the purpose of masking background noise, i.e., a background noise mask applied to a spectrogram removes background noise from the spectrogram after the spectrogram is converted back to an audio signal.

In some implementations, the engine 130 is configured to prioritize identifying faces for speakers physically closer to the camera 115, which can be helpful for processing the video in real-time when many speakers are present. In some implementations, the engine prioritizes processing faces of speakers in the center of the frame, which can be an indication that those speakers are the focus of the input video. As described in more detail below, the engine 130 can identify and generate embeddings for speakers in the input video. For example, the engine 130 can generate an isolated speech signal for speakers selected through a corresponding user interface on the user device 105 for the engine 130.

In addition to processing frames of the input video, the engine 130 is configured to process the audio soundtrack of the input video, and specifically portions of audio corresponding to each frame of the input video as the frame is received. The engine 130 extracts audio features for the speakers in the input video. Audio features are characteristics of the speech of a speaker. The engine 130 computes a plurality of time-frequency bins for the audio soundtrack, each time-frequency bin representing audio features, e.g., the frequency of the audio soundtrack, for audio of a current frame. As part of extracting audio features, the engine 130 can generate audio embeddings for audio at each frame. An audio embedding represents audio features of an audio soundtrack.

While the foregoing described the engine 130 as configured to process input video to generate isolated speech signals for speakers in real-time, in some implementations the engine 130 is configured to process a pre-recorded input video. In those implementations, the length of each time-frequency bin can vary across a larger range, e.g., 3 seconds, because the engine 130 processes the entire input video before providing the isolated speech signals.

Once generated, the engine 130 can send isolated speech signals to the listening device 125 to play back to a user of the user device 105, the speech audio of at least one speaker in the input video. The user device 105 outputs the corresponding isolated speech for each speaker in real-time. The isolated speech is sent to the listening device 125 operatively coupled to the user device 105, for example in the form of a signal representing speech data, and played back by the listening device 125 as speech audio for perception by the user. The listening device 125 can be any device configured to receive and play back audio, e.g., wireless headphones or a medical hearing device. Before sending the isolated speech signals to the listening device 125, the user device may be configured to perform additional filtering to enhance user listening experience. For example, the user device can be configured to upscale or downscale audio quality. The user device can apply one of a plurality of audio filters, either automatically or in response to user input. The user device can balance volume levels, particularly in cases in which different isolated speech signals largely vary in volume.

The listening device 125 can play back isolated speech signals to one or more audio channels, and in some implementations the user device 105 is configured to send isolated speech signals for different speakers to different audio channels for reception by the listening device 125. The user device 105 can send the speech signals to match a predicted location of the speakers relative to the listening device 125. For example, if the user device 105 is tracking speech on either side of a user of the device, then the user device can send the isolated speech signals to match the location of the speaker.

The speech separation engine 130, the microphone 120, the camera 115, the display 110 and the listening device 125 are showed on a mobile device 105 for the system 100 for the ease of illustration. Each component, i.e., the speech separation engine 130, the microphone 120, the camera 115, the display 110 and the listening device 125, of the system 100 can be arranged in one or more physical devices that can communicate with each other through wireless connections or physical connections. For example, the speech separation engine 130 can be arranged in the listening device 125, while the microphone 120, camera 115, and display 110 are peripherals of the listening device, thus can be arranged in multiple physical devices and connected with the listening device 125 through wireless connections, i.e., a wireless network.

Each components of the speech separation engine 130 can also be distributed onto one or more physical devices that can communicate with each other accordingly. For example, the component of the speech separation engine 130 used for generating isolated soundtracks can be arranged in a sound recorder located in an environment, the component used for generating face embeddings from the input video can be arranged in a camera located in the same environment and connected with the sound recorder using wireless communication, i.e., Bluetooth®.

In some implementations, the process of the system 100 can be implemented on one or more connected physical devices. For example, the audio-visual speech separation process can be implemented by the speech separation engine 130 on a mobile device, i.e., a cellphone or a tablet, while the audio enhancement process, i.e., increasing volume of one or more speakers, shifting frequencies of audio soundtracks belonging to one or more speakers, and filtering the background noise from the spectrogram using one of the plurality of audio filters, can be implemented by the system 100 on the listening device 125.

In some implementations, the listening device, or any other physical devices that the listening device is connected to, i.e., a cell phone, can include one or more buttons that allow the user to control the audio enhancement process, the audio-visual speech separation process, and even the entire system 100. That is, the one or more buttons are configured to be pressed by the user to enable or disable one or more of the above-noted processes, and/or to enable or disable the system 100.

Figure 2:
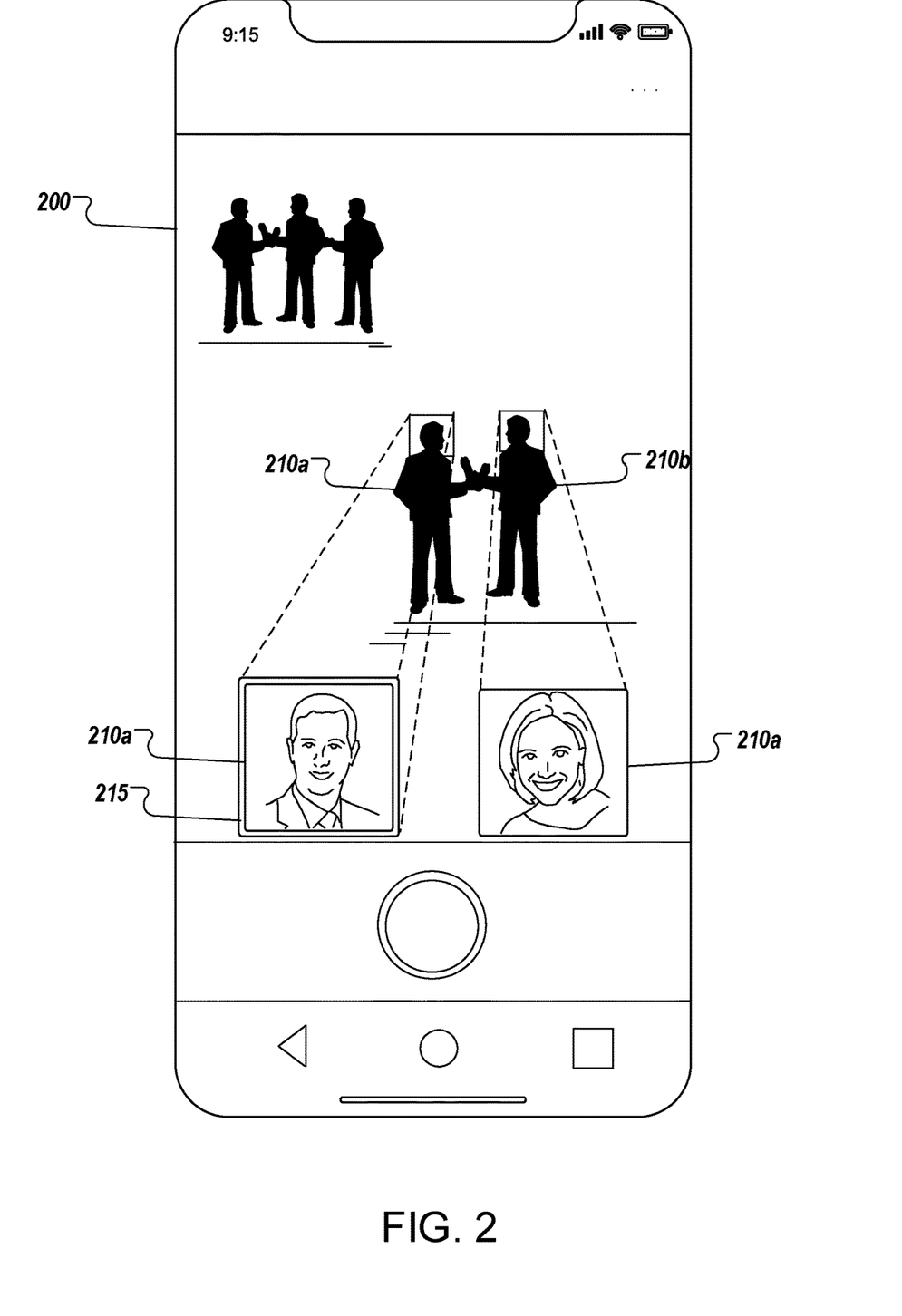
FIG. 2 illustrates an example of a user interface 200 for obtaining isolated speech signals.

FIG. 2 illustrates an example of a user interface 200 for obtaining isolated speech signals. A user device displays the current view of a camera of the user device. A view can depict a scene that can include a number of speakers, and for at least some speakers, an indication, e.g., a bounding box, indicating that an isolated speech signal for the speech of the speaker is currently being generated. For example, in the current view 205, speakers 210*a* and 210*b* are being tracked with corresponding bounding boxes 215. The user interface 200 is configured to enlarge bounding boxes for speakers in focus while the camera records the scene. The user device implementing the user interface 200 tracks some, but not all speakers in the current scene 205. The range for the user device is limited by the audible range of the microphone for the user device, or the range can be limited according to a predetermined threshold, which can be set for maintaining speaker privacy. The user interface 200 is configured to receive input, e.g., tactile input, for selecting which isolated speech signals are output for speakers detected in the current scene 205. The user interface 200 can indicate visually which speakers are currently selected, e.g., by an indicator 215.

The user interface 200 can also highlight speakers or bounding boxes of speakers whose corresponding isolated audio signals are currently being sent to the listening device, which can further improve distinction between speech of different speakers in a crowded setting. The user device is configured to generate isolated speech signals for selected speakers and generate an audio transcript for the selected speakers for display on the user interface 200. The transcript can include converted speech-to-text for one or more speakers. The user interface 200 is configured to display the transcript in real-time, and is further configured to save transcripts for later retrieval.

As described above, the user device can send different signals to different audio channels to a listening device that supports multiple audio channels, e.g., supports stereo sound. The user device is configured to send an isolated speech signal for the speaker 210*a* to sound as though the speaker 210*a* is on the left side of a user listening through a corresponding listening device, and to send an isolated speech signal for the speaker 210*b* to sound as though the speaker 210*b* is on the right side of a user listening through the listening device.

In some implementations, the user device generates a translation of isolated speech for a selected speaker. For example, after obtaining the isolated speech signal, the user device generates a translation of the speech signal in real-time, e.g., using any one of a number of different techniques for speech translation, including identifying the language spoken in the audio signal, and generating corresponding speech in a target language. The user device is configured to receive an indication for the target language, and is further configured to send speech in the target language to the coupled listening device. The user device can translate speech automatically for each speaker, or only for some designated speakers.

When more than one of the selected speakers is speaking, the user device can send isolated speech signals for each of the selected speakers, up to a threshold number. For example, the user device may send isolated speech signals simultaneously for up to two speakers. In some implementations, the user device prioritizes some speakers over other speakers, according to user input indicating preference. For example, the user device can prioritize one speaker such that when the user device detects the speech of multiple speakers including the prioritized speaker, the user device always sends the isolated speech signal of the prioritized speaker to the listening device and to the exclusion of some or all of the other speakers.

In some implementations, the user device is configured to automatically generate isolated speech signals of speakers in the current view of the camera of the device. When a speaker is not in the current view, the speech from the speaker is filtered out, allowing a user to focus the user device to aim at speakers of interest with the camera at the exclusion of other speakers.

In some implementations, the user device can use the above-described techniques to learn a signature (or a "fingerprint") corresponding to a speaker that is depicted in a video and then subsequently use the learned signature to isolate the speech of the speaker when performing audio-only speech detection. As one illustrative example, a user can capture a short video of a given speaker while the given speaker is talking using a mobile device. The mobile device (or another user device) can then generate a learned signature for the given speaker from the short video. The user can then place the mobile device down so that the device continues to capture the audio track without needing to capture the corresponding video track. The mobile device can then isolate the speech of the given speaker from the audio track and the signature and play back the isolated speech for the user.

In more detail, the user device is configured to learn the speech of a speaker and automatically isolate their speech even when the speaker is not in the current view of the camera. In some implementations, the user device can enter a calibration period, in which the user device records a video of the target speaker while they are speaking. The user device generates an isolated speech signal using both audio and visual features extracted from input video and corresponding audio, i.e., as described above with reference to FIG. 1. The user device obtains a signature, e.g., a digest or hash of data representing the isolated speech signal for the target speaker. Thereafter the user device ends the calibration period and the user device can process audio for the input video and identify the speech corresponding to the target speaker using any appropriate technique for audio-only speech detection. Specifically, the user device generates and compares signatures for the identified sources of speech against the signature for the target speaker. If the user device identifies a matching source of speech within a threshold value, the user device generates an isolated speech signal for the matched source of speech, and sends the signal to the listening device for playback.

Figure 3:
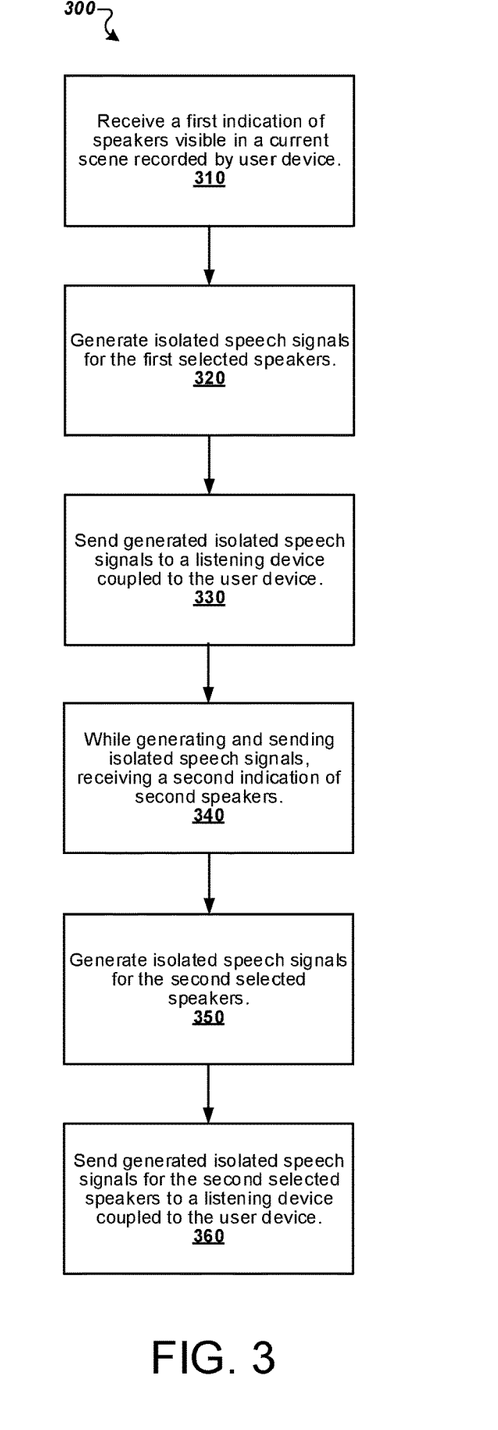
FIG. 3 is a flow chart of an example process for determining, from an input video of one or more speakers, an isolated speech signal for each speaker.

FIG. 3 is a flow chart of an example process 300 for determining, from an input video of one or more speakers, an isolated speech signal for each speaker. For convenience, the process 300 will be described as being performed by a system of one or more computers located in one or more locations. For example, a system, e.g., the system 100 of FIG. 1, appropriately programmed in accordance with this specification, can perform the process 300. Additional detail for implementing a system that performs the process 300 can be found in the description of FIG. 1 and FIG. 2, above.

The system receives 310 a first indication of one or more first speakers visible in the current view recorded by a camera of the user device. As described above with reference to FIG. 2, the user device is configured to receive input, e.g., touch input on the display on the user device, for selecting speakers of interest while the speakers are in the current view of the camera of the user device. Alternatively, the one or more first speakers can be automatically determined, e.g., based on which speakers are in the current view recorded by the camera.

In response to receiving the first indication, the user device generates 320 a respective isolated speech signal for each of the one or more first speakers that isolates speech of the speaker in the current view. After generating the isolated speech signals, e.g., according to the techniques described above with reference to FIG. 1, the user device sends 330 the isolated speech signals for each of the one or more first speakers to a listening device operatively coupled to the listening device. The isolated speech signals are generated and sent on an on-going basis, e.g., while the selected speakers are in the current view of the camera of the user device, or according to any other parameters as described above with reference to FIG. 1 and FIG. 2.

While generating the respective isolated speech signal for each of the one or more first speakers, the user device receives 340 a second indication of one or more second speakers visible in the current scene recorded by the camera of the user device. The second speakers can overlap with the first speakers, or be completely different speakers in the current view of the camera of the user device. For example, the user can operate the user device to record a different part of a scene, e.g., moving from one speaker in a room to another speaker in the room. In response to the second indication, the user device generates 350 and sends 360, to the listening device, a respective isolated speech signal for each of the one or more second speakers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Implementations of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, by a user device, a first indication of one or more first speakers visible in a current view recorded by a camera of the user device;
   in response to receiving the first indication, generating a respective isolated speech signal for each of the one or more first speakers that isolates speech of each of the one or more first speakers in the current view and sending the isolated speech signals for each of the one or more first speakers to a listening device operatively coupled to the user device, wherein sending the isolated speech signals for each of the one or more first speakers to the listening device comprises, for each first speaker of the one or more first speakers:
      identifying a respective location of the first speaker relative to a location of the listening device that is configured to receive audio input from a plurality of audio channels; and
      sending an isolated speech signal to a respective audio channel of the plurality of audio channels in accordance with the respective location of the first speaker corresponding to the isolated speech signal;
   while generating the respective isolated speech signal for each of the one or more first speakers, receiving, by the user device, a second indication of one or more second speakers visible in the current view recorded by the camera of the user device; and
   in response to the second indication, generating and sending a respective isolated speech signal for each of the one or more second speakers to the listening device.

2. The method of claim 1, further comprising:
   for each of one or more of the first speakers, processing a respective isolated speech signal for the speaker to generate a transcription of the speech of the speaker; and
   displaying the transcription while sending the isolated speech signal of the first speaker.

3. The method of claim 1, wherein the one or more first speakers indicated are speakers at or near the center of the current view recorded by the camera.

4. The method of claim 1, wherein the generating and the sending of the isolated speech signals of the one or more first speakers comprises generating and sending an isolated speech signal of a first speaker of the one or more first speakers only while the first speaker is visible in the current view recorded by the camera.

5. The method of claim 1, wherein the method further comprises receiving an indication of a preferred speaker of the one or more first speakers, and whenever generating and sending isolated speech signals for more than one first speaker, generating and sending an isolated speech signal for the preferred speaker at the exclusion of the other first speakers.

6. The method of claim 5, wherein receiving the indication of the preferred speaker comprises receiving, at the user device, a user input selecting the preferred speaker.

7. The method of claim 1,
   wherein receiving the first indication comprises receiving, at the user device, a first user input indicating the one or more first speakers; and
   wherein receiving the second indication comprises receiving, at the user device, a second user input indicating the one or more second speakers.

8. The method of claim 7, wherein the first user input and/or the second user input is a user selection received via a display operatively coupled to the user device.

9. One or more non-transitory computer-readable storage media encoded with instructions that, when executed by one or more computers, cause the one or more computers to perform operations, the operations comprising:
   receiving, by a user device, a first indication of one or more first speakers visible in a current view recorded by a camera of the user device;
   in response to receiving the first indication, generating a respective isolated speech signal for each of the one or more first speakers that isolates speech of each of the one or more first speakers in the current view and sending the isolated speech signals for each of the one or more first speakers to a listening device operatively coupled to the user device, wherein sending the isolated speech signals for each of the one or more first speakers to the listening device comprises, for each first speaker of the one or more first speakers:

identifying a respective location of the first speaker relative to a location of the listening device that is configured to receive audio input from a plurality of audio channels; and sending an isolated speech signal to a respective audio channel of the plurality of audio channels in accordance with the respective location of the first speaker corresponding to the isolated speech signal;

while generating the respective isolated speech signal for each of the one or more first speakers, receiving, by the user device, a second indication of one or more second speakers visible in the current view recorded by the camera of the user device; and in response to the second indication, generating and sending a respective isolated speech signal for each of the one or more second speakers to the listening device.

10. The one or more non-transitory computer-readable storage media of claim 9, further comprising:

for each of one or more of the first speakers, processing a respective isolated speech signal for the speaker to generate a transcription of the speech of the speaker; and displaying the transcription while sending the isolated speech signal of the first speaker.

11. The one or more non-transitory computer-readable storage media of claim 9, wherein the operations further comprise receiving an indication of a preferred speaker of the one or more first speakers, and whenever generating and sending isolated speech signals for more than one first speaker, generating and sending an isolated speech signal for the preferred speaker at the exclusion of the other first speakers.

12. A system comprising one or more computers and one or more storage devices storing instructions that when executed by the one or more computers cause the one or more computers to perform operations, the operations comprising:

receiving, by a user device, a first indication of one or more first speakers visible in a current view recorded by a camera of the user device;

in response to receiving the first indication, generating a respective isolated speech signal for each of the one or more first speakers that isolates speech of each of the one or more first speakers in the current view and sending the isolated speech signals for each of the one or more first speakers to a listening device operatively coupled to the user device, wherein sending the isolated speech signals for each of the one or more first speakers to the listening device comprises, for each first speaker of the one or more first speakers:

identifying a respective location of the first speaker relative to a location of the listening device that is configured to receive audio input from a plurality of audio channels; and sending an isolated speech signal to a respective audio channel of the plurality of audio channels in accordance with the respective location of the first speaker corresponding to the isolated speech signal;

while generating the respective isolated speech signal for each of the one or more first speakers, receiving, by the user device, a second indication of one or more second speakers visible in the current view recorded by the camera of the user device; and in response to the second indication, generating and sending a respective isolated speech signal for each of the one or more second speakers to the listening device.

13. The system of claim 12, further comprising:

for each of one or more of the first speakers, processing a respective isolated speech signal for the speaker to generate a transcription of the speech of the speaker; and displaying the transcription while sending the isolated speech signal of the first speaker.

14. The system of claim 12, wherein the operations further comprise receiving an indication of a preferred speaker of the one or more first speakers, and whenever generating and sending isolated speech signals for more than one first speaker, generating and sending an isolated speech signal for the preferred speaker at the exclusion of the other first speakers.

15. The method of claim 7, wherein the first user input comprises a tactile input for selecting the one or more first speakers.

16. The method of claim 1, further comprising:

in response to receiving the first indication, displaying a visual indicator that indicates that the one or more first speakers are selected.

17. The non-transitory computer-readable storage media of claim 9, wherein receiving the first indication comprises receiving, at the user device, a first user input indicating the one or more first speakers; and wherein receiving the second indication comprises receiving, at the user device, a second user input indicating the one or more second speakers.

18. The non-transitory computer-readable storage media of claim 9, wherein the operations further comprise:

in response to receiving the first indication, displaying a visual indicator that indicates that the one or more first speakers are selected.

19. The system of claim 12, wherein receiving the first indication comprises receiving, at the user device, a first user input indicating the one or more first speakers; and wherein receiving the second indication comprises receiving, at the user device, a second user input indicating the one or more second speakers.

20. The system of claim 12, wherein the operations further comprise:

in response to receiving the first indication, displaying a visual indicator that indicates that the one or more first speakers are selected.

* * * * *